(12) United States Patent
Caldwell et al.

(10) Patent No.: US 7,623,486 B2
(45) Date of Patent: *Nov. 24, 2009

(54) SYSTEM AND METHOD FOR CONNECTING TO A VOICE NETWORK, SUCH AS WIRELESSLY CONNECTING TO A UMA NETWORK

(75) Inventors: Christopher Caldwell, Woodinville, WA (US); Janne Linkola, Espoo (FI); Michael Hendrick, Renton, WA (US); James Hsu, Bothell, WA (US); Jelena Senour, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 560 days.

This patent is subject to a terminal disclaimer.

(21) Appl. No.: 11/480,775

(22) Filed: Jun. 30, 2006

(65) Prior Publication Data

US 2008/0004009 A1    Jan. 3, 2008

(51) Int. Cl.
*H04W 4/00*    (2006.01)
(52) U.S. Cl. .................. 370/328; 370/352; 370/230; 370/280; 455/434; 455/450
(58) Field of Classification Search ............. 370/338, 370/228, 229, 230, 328, 329, 331, 352, 401, 370/490; 455/434, 414.1, 450, 452.2, 456.1, 455/464, 566
See application file for complete search history.

(56) References Cited

U.S. PATENT DOCUMENTS

| 5,475,677 A * | 12/1995 | Arnold et al. ............... 370/280 |
| 2004/0072581 A1 | 4/2004 | Tajima et al. |
| 2004/0142693 A1 | 7/2004 | Feder et al. |
| 2006/0095954 A1* | 5/2006 | Buckley et al. ............... 726/2 |

FOREIGN PATENT DOCUMENTS

| WO | WO-01/58190 A1 | 8/2001 |
| WO | WO-2006/047862 A1 * | 5/2006 |

* cited by examiner

*Primary Examiner*—Matthew D Anderson
*Assistant Examiner*—Shaima Q Aminzay
(74) *Attorney, Agent, or Firm*—Perkins Coie LLP

(57) ABSTRACT

Systems and methods for connecting a mobile device to an alternate wireless network are disclosed. The method includes determining alternate wireless networks available to access by the mobile device, ordering the available alternate wireless networks by signal strength, connecting the mobile device to the alternate wireless network with a highest signal strength, measuring a quality of the connected alternate wireless network and, when the quality of the connected alternate wireless network is above a predetermined threshold, operating the mobile device over the connected alternate wireless network.

32 Claims, 7 Drawing Sheets

SYSTEM AND METHOD FOR CONNECTING TO A VOICE NETWORK, SUCH AS WIRELESSLY CONNECTING TO A UMA NETWORK

BACKGROUND

3GPP, or the 3rd Generation Partnership Project, is a collaboration agreement that was established in Dec. 1998 between various organizations including: ETSI (Europe), ARIB/TTC (Japan), CCSA (China), ATIS (North America) and TTA (South Korea). The scope of 3GPP was to make a globally applicable third generation (3G) mobile phone system specification. Global System for Mobile Communications (GSM) is the most popular standard for mobile phones in the world. The 3GPP specifications are based on the evolution of the GSM specifications, now generally known as the UMTS (Universal Mobile Telecommunications System).

Unlicensed Mobile Access (UMA) lets wireless service providers merge cellular networks and IP-based wireless networks into one seamless service with one mobile device, one user interface, and a common set of network services for both voice and data. The UMA solution converges cellular networks with any IP-based wireless access network, such as IEEE 802.16 (WiMAX) networks, IEEE 802.20 Mobile Broadband Wireless Access (MBWA), Ultra Wideband (UWB) networks, 802.11 wireless fidelity (Wi-Fi) networks, and Bluetooth networks. UMA has recently been accepted into release 6 of the 3GPP standard as a General Access Network (GAN).

With UMA or GAN, subscribers may move between the cellular networks and IP-based wireless networks with seamless voice and data session continuity as transparently as they move between cells within the cellular network. Seamless in-call handover between the IP-based wireless network and cellular network ensures that the user's location and mobility do not affect the services delivered to the user. The subscriber experiences service, location, and mobility transparency. Services may be identical when connected over the IP-based wireless network or the cellular network.

UMA effectively creates a parallel radio access network, the UMA network (UMAN), which interfaces to the mobile core network using existing mobility-enabled, standard interfaces. The mobile core network remains unchanged. The common mobile core network makes it possible to deliver full service and operational transparency. The existing service provider Business Support Systems (BSS), service delivery systems, content services, regulatory compliance systems, and Operation Support Systems (OSS) can support the UMA network without change. Service enhancements and technology evolution of the mobile core network apply transparently to both the cellular access and UMA networks.

Typical wireless connections allow users via software clients to connect a wireless device to an access point associated with an alternate wireless network, in order to access a communication network such as the Internet. Generally, these software clients locally store parameters associated with alternate wireless networks available to the device, in order to provide the device with quick and open access when a user requests such access. Additionally, users of the device (and client) are able to add, delete, and/or modify the stored alternate wireless networks within the device. In some cases, these clients typically operate in two modes: (1) an automatic mode whereby the client scans available frequencies and automatically connects to available alternate wireless networks, and (2) a manual mode whereby the client provides a user with a list of alternate wireless networks and the user chooses a network. Generally, however, the client will connect to any available alternate wireless network.

As mentioned above, UMA networks typically provide voice communications. Unlike data connections, voice connections are sensitive to changes in connection speed, jitter, and other hindrances that negatively effect a connection. Therefore, it may not be ideal to invoke a connection to a voice communication network in a similar fashion to other types of communications. These and other problems exist with respect to wirelessly connecting to IP-based networks.

BRIEF SUMMARY OF THE INVENTION

Not Applicable

DETAILED DESCRIPTION

Figure 1A:
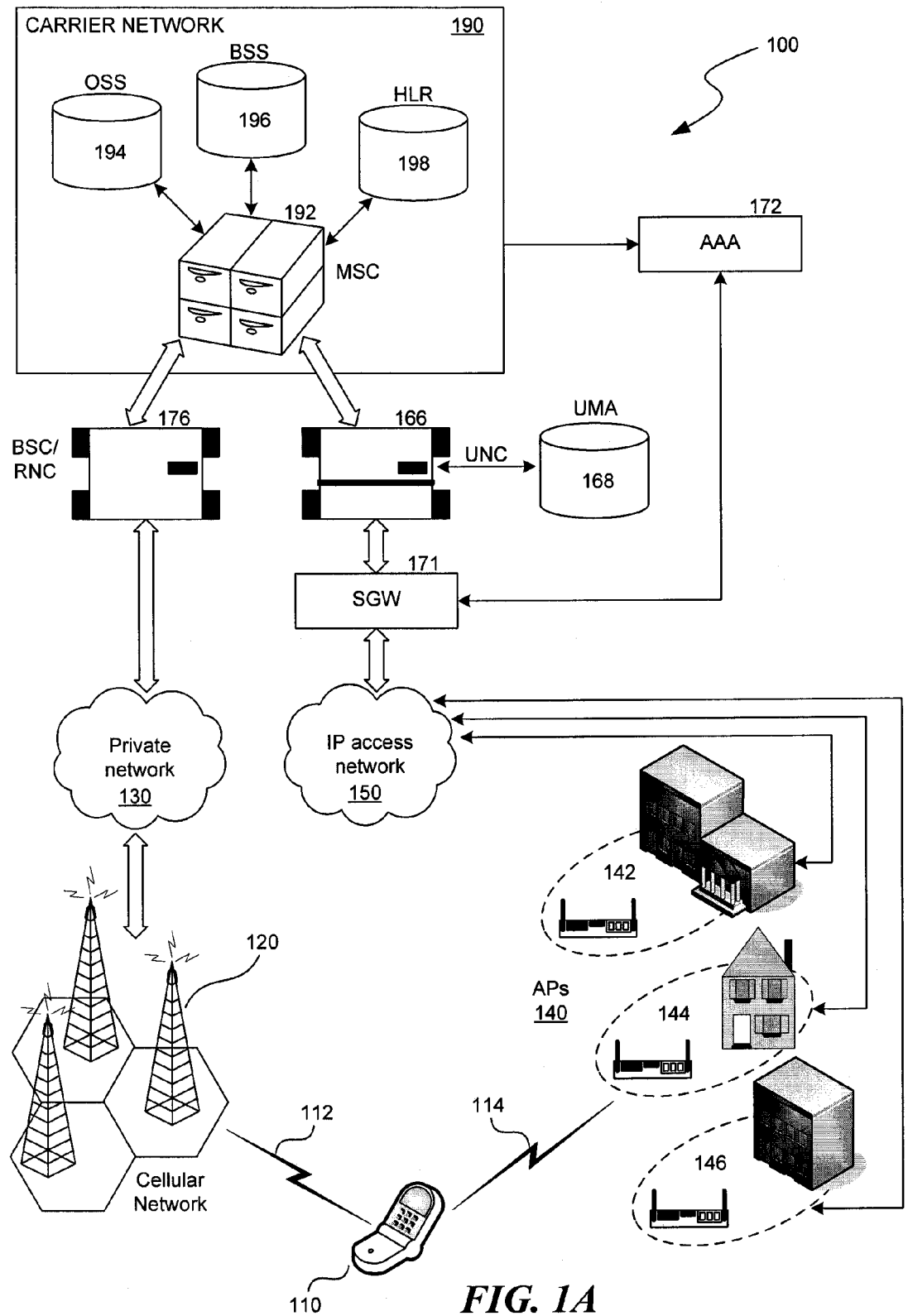
FIGS. 1A and 1B illustrate example systems that combine a cellular telephone network with a UMA network.

The technology will now be described with respect to various embodiments. The following description provides specific details for a thorough understanding of, and enabling description for, these embodiments of the technology. However, one skilled in the art will understand that the technology may be practiced without these details. In other instances, well-known structures and functions have not been shown or described in detail to avoid unnecessarily obscuring the description of the embodiments of the technology.

It is intended that the terminology used in the description presented below be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this Detailed Description section.

A system and method for invoking a connection between a mobile device and an available alternate wireless network in order for the mobile device to access a UMA network is disclosed. In some cases, the mobile device scans for and creates a list of alternate wireless networks (e.g., open public networks, secured networks to which the mobile device has access) available for connection. In some cases, the mobile device contains a database of alternate wireless networks available for connection. The mobile device selects a network from the list and attempts a connection. Upon successful connection with an alternate wireless network, the mobile device may check the quality of the network. Should the quality be above a pre-determined threshold, the mobile device enters an alternate wireless network mode and a user of the device may place voice calls, interact with the device and exchange data over a connection, and so on, as if the device was under GSM mode or any other mode.

The system and method, therefore, provides a user with an easy way to connect to alternate wireless networks otherwise unknown to the user. Additionally, the system facilitates a mobile device to connect with the "best" available network, which may reduce or eliminate dropped calls and other hindrances in connections, such as voice connections.

Example UMA Network

Unlicensed Mobile Access (UMA) allows cellular service providers to offer their products and services seamlessly over Internet-connected broadband networks. Cellular phones may use a cellular network, as well as any IEEE 802.16 (WiMAX) networks, IEEE 802.20 Mobile Broadband Wireless Access (MBWA), Ultra Wideband (UWB) networks, 802.11 wireless fidelity (Wi-Fi) networks, and Bluetooth networks, and so on, to access points that are then connected to DSL (Digital Subscriber Line) or cable modems, or some other broadband Internet connections such as in a subscriber's home or access points in public or corporate areas that have Internet connectivity. Thus, mobile devices may connect to and access licensed spectrums (such as spectrums for cellular communications) via alternate licensed and unlicensed spectrums (such as via an UMA access point).

One point of UMA is "abstraction." A cellular service provider's systems that deliver content and handle mobility may not be aware that a subscriber's mobile device is on a UMA network. The system may instead assume the mobile device is on a GSM network just like any other. Thus, the IP network is abstracted with respect to the cellular network, regardless of whether, for example, the mobile device connects to the cellular network via a base station (for licensed spectrum access) or a wireless access point (for unlicensed spectrum access).

A non-exhaustive list of products and services available on UMA includes not only voice services, but also supplementary services like call forwarding and call waiting, text messaging services like SMS, and data-based services like ringtone downloads, game downloads, picture messaging, email and web browsing. Further, since a mobile device is connected to an IP network, all manner of data services available over such networks may be provided to the mobile device.

Instead of using towers broadcasting on licensed spectrum, UMA takes the familiar GSM system protocol, encapsulates it into Internet protocol (IP) packets and uses the Internet as a transport to deliver those to the cellular service provider's mobile core network, thus bypassing the existing network of radio towers. Because GSM protocols are used both in the traditional radio tower and the IP network, the cellular service provider maintains a large degree of system compatibility while using the Internet to provide its services.

FIG. 1A is an illustration of a system 100 that combines a cellular telephone network with a UMA network. The described system 100 is arranged to accept registration requests and call connections from a mobile subscriber (MS) or mobile device 110 to either a cellular telephone network, or to a UMA network.

The example cellular telephone network includes one or more base transceiver stations (BTS) 120 that are configured to accept cellular communications 112 from mobile device 110. The private network can include a variety of private connections such as T1 lines, a wide area network (WAN), a local area network (LAN), various network switches, to name a few. BSC/RNC 176 controls network communication traffic to the carrier network 190, where all communications are managed. An example carrier network 190 includes a mobile switching center (MSC) 192, which is arranged as part of the core network for the carrier to control data/call flows, perform load balancing, as well as other functions. A variety of databases are also accessed in the carrier network such as, e.g., OSS 194, BSS 196, and HLR 198, for billing, call logging, etc.

The example UMA network includes an access point (AP) 140 or multiple access points that are arranged to accept IP communications 114 from mobile device 110. AP 140 can be configured as part of a wireless network in one or more locations such as a public network 142, a home network 144, or a private business network 146. Each access point (AP) is coupled to an Internet protocol (IP) network 150 through a broadband connection. Most access points in a home setting also include IP-routing capabilities. IP Network 150 is arranged to route IP packets that carry UMA communications (data, voice, SMS, etc.) between the APs and the security gateway (SGW) 171. The security gateway controls access to the UMA network controller (UNC) 166, which is arranged to communicate with a UMA database (UMA dB) 168 for logging and accessing various data associated with UMA communications. UNC 166 is also arranged to communicate with the carrier network 190 similar to the BSC/RNC.

Authentication is handled by the security gateway (SGW) 171, which is arranged to communicate with an authentication and access authorization (AAA) module 172 as shown in FIG. 1A. Challenges and responses to requests for access by a mobile device 110 are communicated between HLR database 198 and the AAA module 172. When authorization is granted, SGW 171 is arranged to communicate the assignment of a GAN IP address to mobile device 110. Once the GAN IP address is passed to MS handset 110 by SGW 171, the public IP address assigned to the handset is passed to the UNC.

Figure 1B:
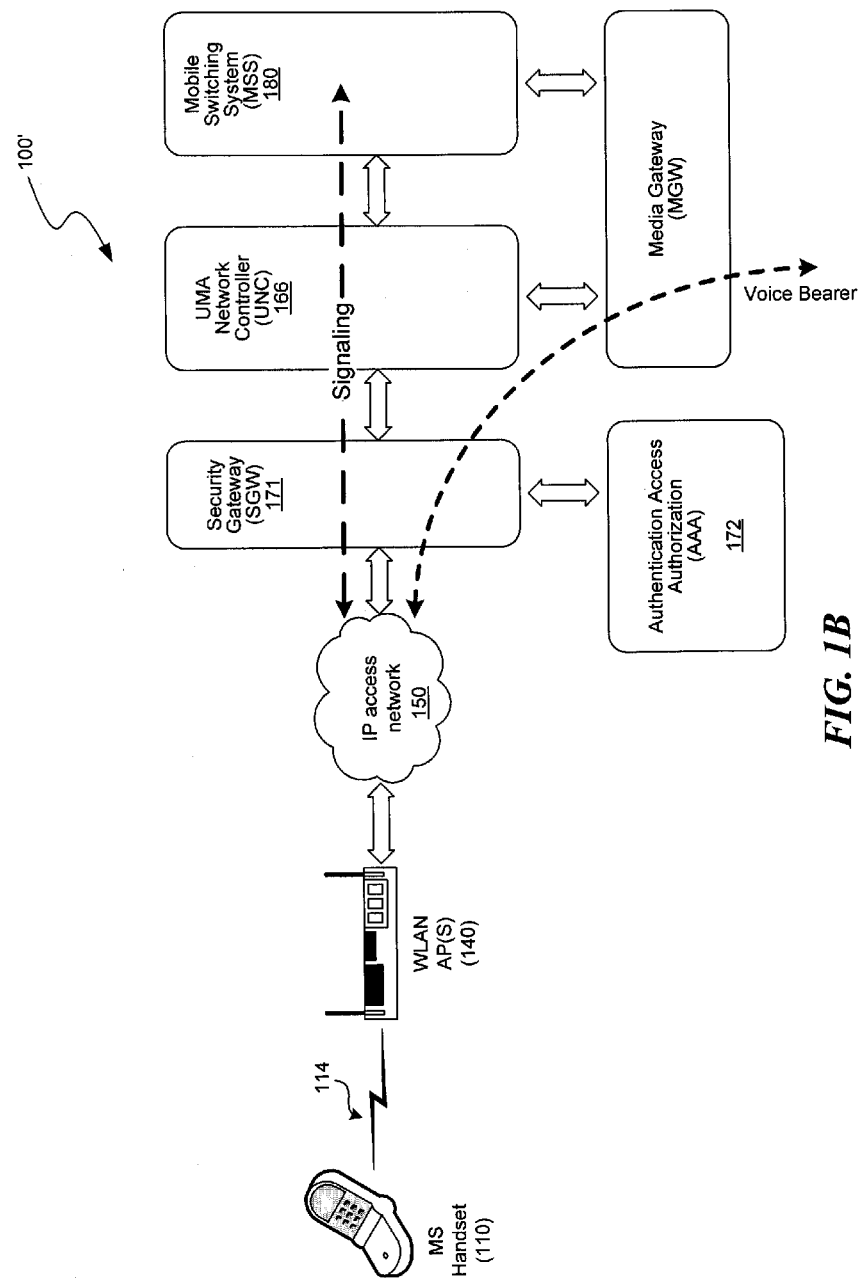

FIG. 1B illustrates another example system 100 that combines a cellular telephone network with a UMA network. The described system 100' is again arranged to accept registration requests and call connections from a mobile device 110 to either a cellular telephone network (not shown), or to a UMA network.

The example UMA network includes one or more access points (AP) 140 that are arranged to accept UMA communications 114 from mobile device 110. Each access point is again coupled to an Internet protocol network 150 through a broadband connection. IP Network 150 is arranged to route UMA communications (data, voice, SMS, etc.) between the APs and a security gateway (SGW) 171. The security gateway 171 controls access to the UMA network controller (UNC) 166, which is arranged to communicate with a UMA database (not shown) for logging and accessing various data associated with UMA communications. Authentication, access, and authorization is handled by SGW 171 via AAA module 172, as previously described.

For the example system 100', the signaling path is routed through UNC 166 to a mobile switching system (MSS), while the voice bearer path is routed through UNC 166 to a media gateway (MGW). The signaling portion of a UMA call governs various overhead aspects of the UMA call such as, for example, when the call starts, when the call stops, initiating a telephone ring, etc. The voice bearer portion of the UMA call contains the actual content of the UMA call itself (which can contain either data or voice information). The MGW controls the content flow between the service provider and mobile device 110, while the MSS controls the signaling flow (or control overhead related flow) between the service provider and mobile device 110.

Figure 2:
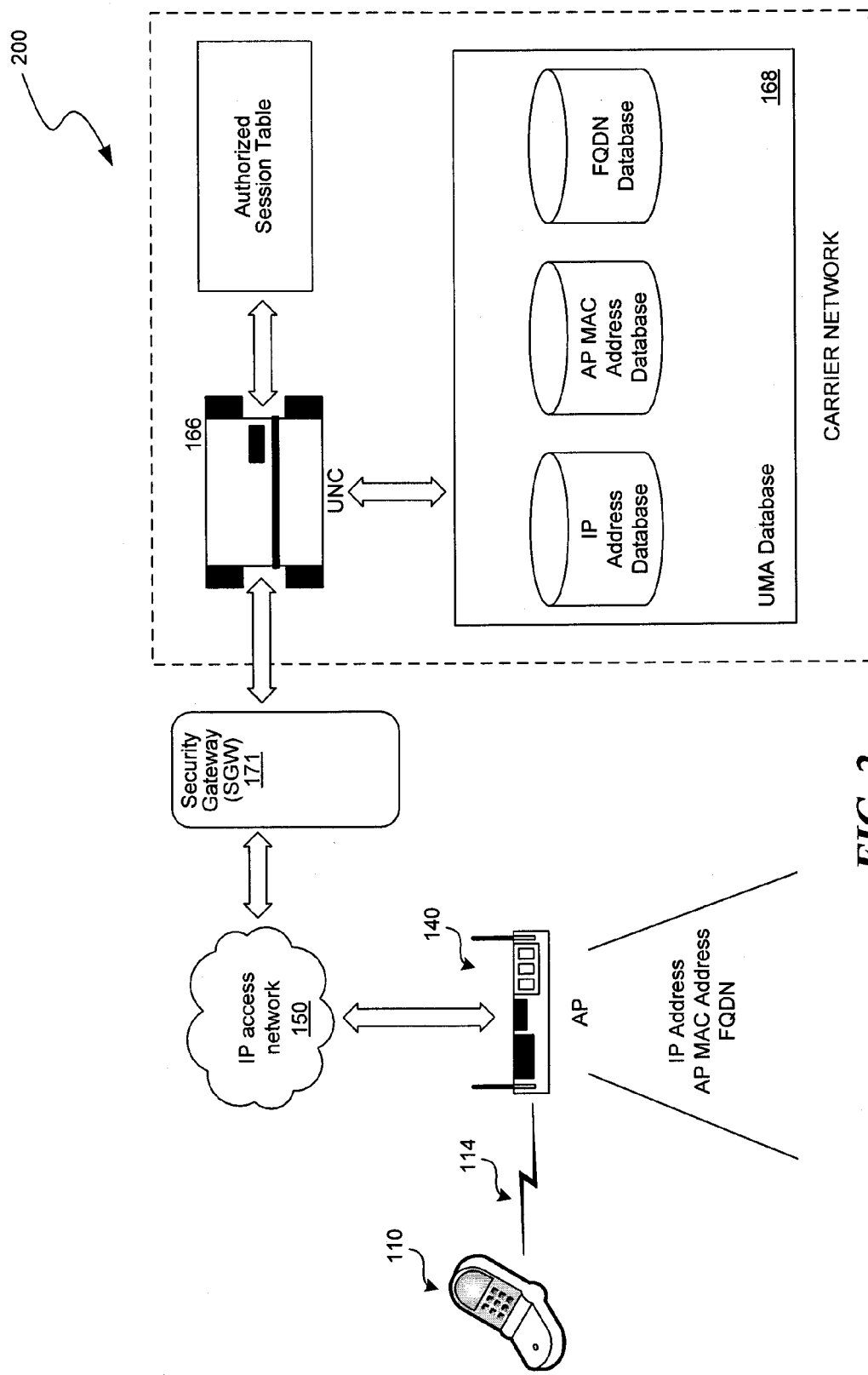
FIG. 2 illustrates a UNC configured in a UMA network to authorize and reject access based on access point (AP) identifiers.

FIG. 2 is an illustration of a UNC configured in a UMA network for managing network authorization. A mobile device 110 is arranged to initiate a connection request with a UMA network via a wireless connection 114 to a local area network (LAN) access point (AP) 140. LAN AP 140 is arranged to communicate with a UMA network controller (UNC) 166 via an IP access network 150, and a security gateway (SGW) 171. UNC 166 is arranged to monitor connection requests associated with each MS, process each connection request, and either permit or reject access to the UMA network based on at least one identifiers associated with the MS. Authorized accesses to the UMA network can be maintained by UNC 166 with an authorized session table, or similar data construct. UNC 166 is arranged in communication with a database (UMA dB) 168 to determine if the MS is authorized for access to the UMA network. Example connection information may include a media access control (MAC) address associated with an access point, an International Mobile Subscriber Identifier (IMSI) associated with mobile subscriber handset, and an Internet protocol (IP) address (or "Public IP address") associated with the access point, a fully qualified domain name (FQDN), to name a few. UMA dB 168 may be a combination of databases such as one for IP addresses, one of MAC addresses, and one for FQDN, or a single database that includes all such identifiers. The databases may be arranged to include "blocked" identifiers such as may be referred to as "blacklisted", as well as "authorized" identifiers that may be referred to as "whitelisted."

Example Process Flow

Figure 3:
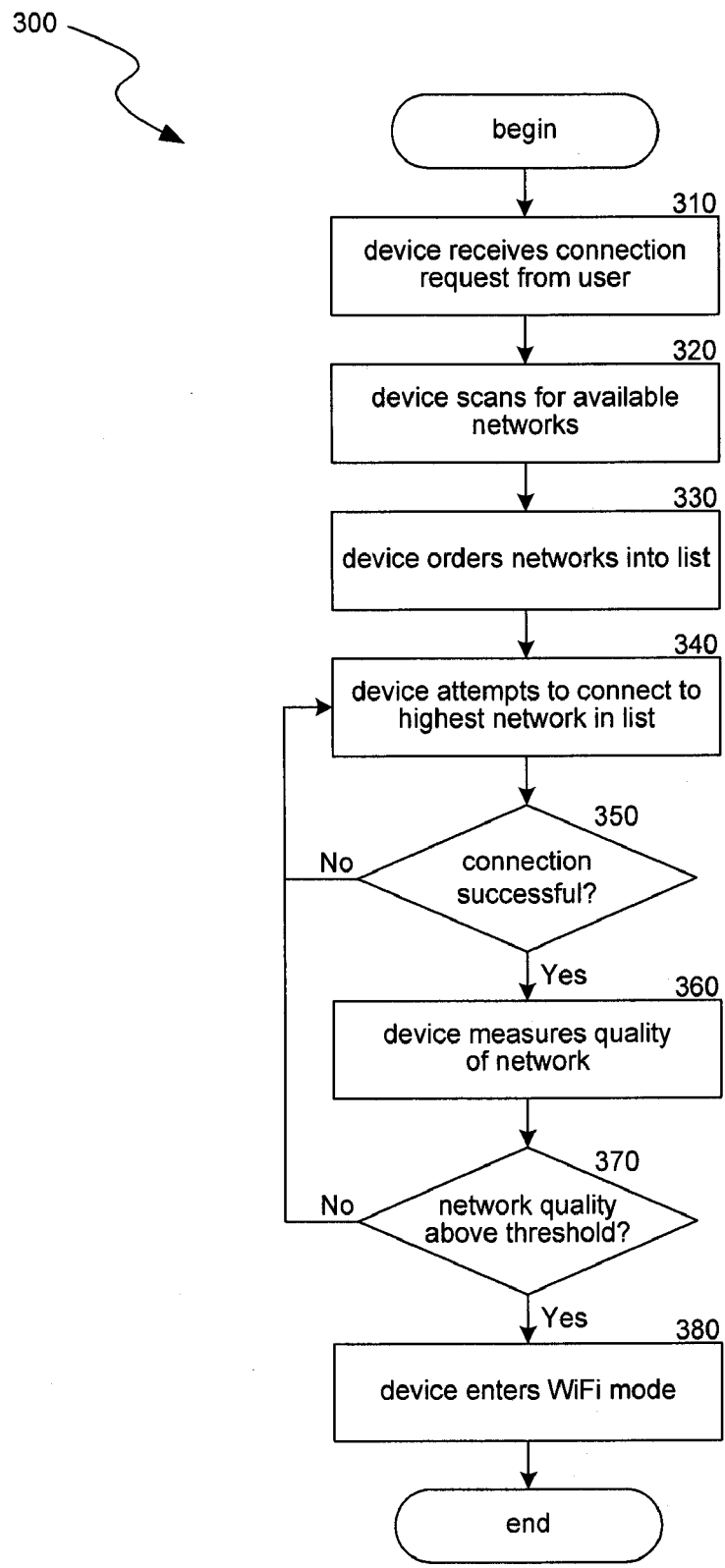
FIG. 3 is an example of a process flow to connect a mobile device to an available alternate wireless network.

Referring to FIG. 3, a process of connecting a mobile device 110 to an available IP-based network is shown as routine 300. In block 310, the mobile device receives a connection request from a user. For example, the user may depress a "connect" button on his or her mobile device or may choose to connect via a menu provided by the device's user interface. As discussed in greater detail below with respect to FIG. 5, the connect button is not limited to any particular physical or soft buttons on the mobile device.

In block 320, the mobile device 110 scans for available alternate wireless networks. For example, the device scans WiFi or other unlicensed frequencies for networks that are either in an "available" state (that is, available for connection by the device) or that are included in a managed network database stored within the mobile device. Upon detection of one or more available alternate wireless networks (e.g., networks available to the user), in block 330, the device creates a list of the available networks. This list may be ordered by signal strength. The mobile device may determine the signal strengths of available alternate wireless networks in a number of ways, such as with a received signal strength indicator (RSSI). In some cases, the device may first list any networks stored within the managed network database, regardless of signal strength, and then list additional available networks found during the scan. Secure networks (e.g., those networks requiring a password to access) may not be listed.

In block 340, the mobile device 110 attempts to connect to the alternate wireless network highest in the list (for example, the network providing the greatest signal strength to the device). At decision block 350, if the connection is successful, the routine continues to block 360, else the routine proceeds back to block 340 and the device attempts connection with the next highest alternate wireless network on the list. Upon successful connection to an alternate wireless network, at block 360, the device measures the quality of the network. At decision block 370, if the system determines the quality of the network to be above a pre-determined threshold, the routine continues to block 380, else the routine proceeds back to block 340 and the device attempts connection with the next highest network on the list. The system may determine the quality of the network in a number of ways. For example, if the network is not a UMA compatible network (or if a UMA connection/call cannot be fully established), then the network will be considered to be below the pre-determined threshold. Additionally, the system may measure URR Uplink quality indicators or other parameters (such as bit or frame error rate) that indicate a network's quality. A main application for a UMA connection is for a voice call, and voice is very sensitive to sudden changes in connection speed, jitter, etc. Thus, by determining a quality of the alternate wireless network connection, a mobile device can help ensure a good experience for the user.

In block 380, the mobile device 110 enters an alternate wireless network mode that enables the device to access UMA services via the selected network connection. (Further details regarding an alternate wireless network mode will be discussed with respect to FIG. 4.) Should the device be unsuccessful in connecting to any of the available networks (or, optionally, unsuccessful in observing an adequate network quality in any connected networks), the mobile device may indicate the lack of success and revert to an idle mode or to the mode previous to the connection invocation of block 310 (e.g., continue communications with the cellular network over a cellular base station).

Alternatively or additionally, the mobile device may manually or automatically add newly found available networks to a mobile device's managed alternate wireless network database. This may be done only in certain cases, such as only after the device performs block 380, or when the device has accessed the same network under routine 300 two or more times. The mobile device may prompt the user and ask whether to add a new network to the list, which may be desirable when a user frequents many locations containing access points and may not want each network added to his/her device's database.

Figure 4:
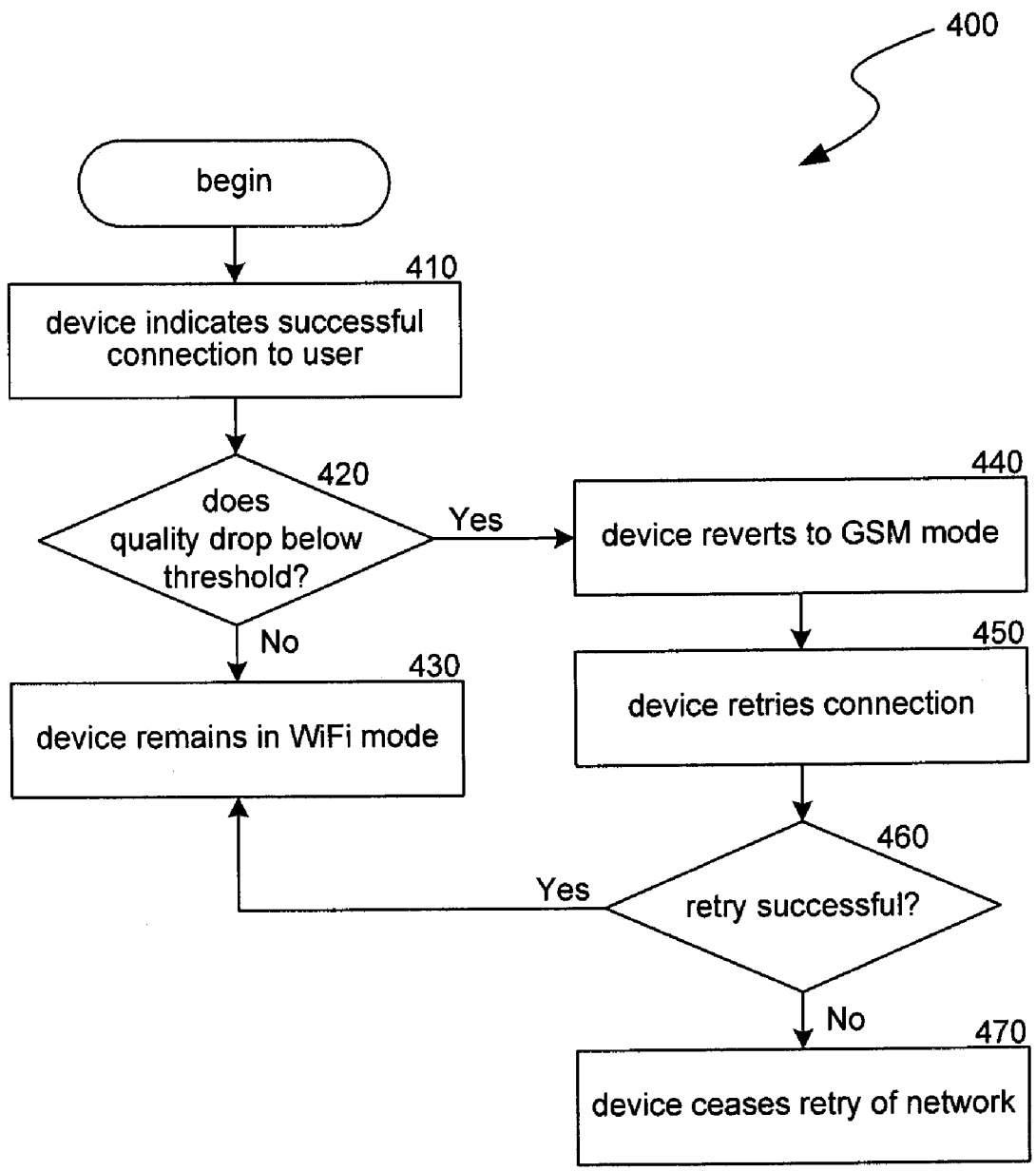
FIG. 4 is an example of a process flow performed when a mobile device is in alternate wireless network mode.

Referring to FIG. 4, a process of maintaining a mobile device in UMA or alternate wireless network mode is shown as routine 400. In block 410, the device indicates to a user a successful connection to an available network, and thus, a transfer of the device to alternate wireless network mode. This indication may include details about the connected network, such as the name of the network, the signal strength, the network's SSID, and so on. The mobile device then operates as normal (although, in alternate wireless network mode) and provides a familiar user interface to a user of the device.

However, a number of factors may take the mobile device out of alternate wireless network mode. In decision block 420, the mobile device continues to monitor the strength and quality of the network connection facilitating the alternate wireless network mode of the device. If the quality of the network remains above a pre-determined threshold, the routine proceeds to block 430, and the device remains in alternate wireless network mode. However, if the quality of the network drops below the threshold, the routine proceeds to block 440 and the device moves out of alternate wireless network mode and back into the normal GSM or cellular mode.

In block 450, the mobile device automatically retries the connection to the previously connected alternate wireless network. At decision block 460, if the retry operation is successful, the routine proceeds to block 430 and the mobile device again moves to alternate wireless network mode under the previous network. If the retry operation is unsuccessful, the routine proceeds to block 470 and the device stops attempting the connection to the network.

In some embodiments, the device may perform retry operations for a pre-determined time period. For example, a user within a coffee shop may be using his/her mobile device over the coffee shop's WiFi network to access UMA services. If the user leaves the shop, the user may lose connection to the shop's network. However, the mobile device will periodically attempt to reconnect to the shop's network without additional input from the user. If the user returns quickly (that is, before a pre-determined time period ends), the device will automatically reconnect the user to the shop's network. However, if the user has left the shop for the day, it would be a misuse of the device's resources to continue reconnection attempts. Therefore, because the device only retries connecting to a previously used network up to a predetermined time period, the system enables a seemingly continuous connection for users who temporarily leave a network area, and enables the termination of a connection for users who have left the network for a long period of time.

In some embodiments, the mobile device may perform retry operations as long as the device remains within communications of a same cell tower. This determination may be based on the tower ID. Alternatively or additionally, the mobile device may perform retry operations while the device is within a predetermined geographic radius, which may be determined based on Global Positioning System (GPS) information. In either case, the phone may store (such as in a cache) state information than enables the quick and automatic reconnections described above.

As explained above, a mobile device may access an IP-based network wirelessly to ensure adequate connectivity to the cellular network via an IP-based network. Further, the mobile device may employ business rules that manage decisions under which the mobile device may transition away from the IP-based network and back to communicating directly with the cellular network. Users may quickly and automatically connect to the IP-based network by simply making a single selection, and not having to perform a manual scan of available networks and selecting one from a list, or by entering a SSID to identify a particular network to which to connect.

Suitable Computing Environment

FIGS. 1A, 1B and 2 and the discussion herein provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, hand-held devices (including personal digital assistants (PDAs)), wearable computers, all manner of cellular or mobile phones, multiprocessor systems, microprocessor-based or programmable consumer electronics, set-top boxes, network PCs, mini-computers, mainframe computers, and the like. Indeed, the terms "mobile device," "computer," and the like are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network. In a distributed computing environment, program modules may be located in both local and remote memory storage devices.

Aspects of the system may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively, computer implemented instructions, data structures, screen displays, and other data under aspects of the invention may be distributed over any network, on a propagated signal on a propagation medium (e.g., an electromagnetic wave(s), a sound wave, etc.) over a period of time, or they may be provided on any analog or digital network (packet switched, circuit switched, or other scheme).

Example Mobile Device

Figure 5:
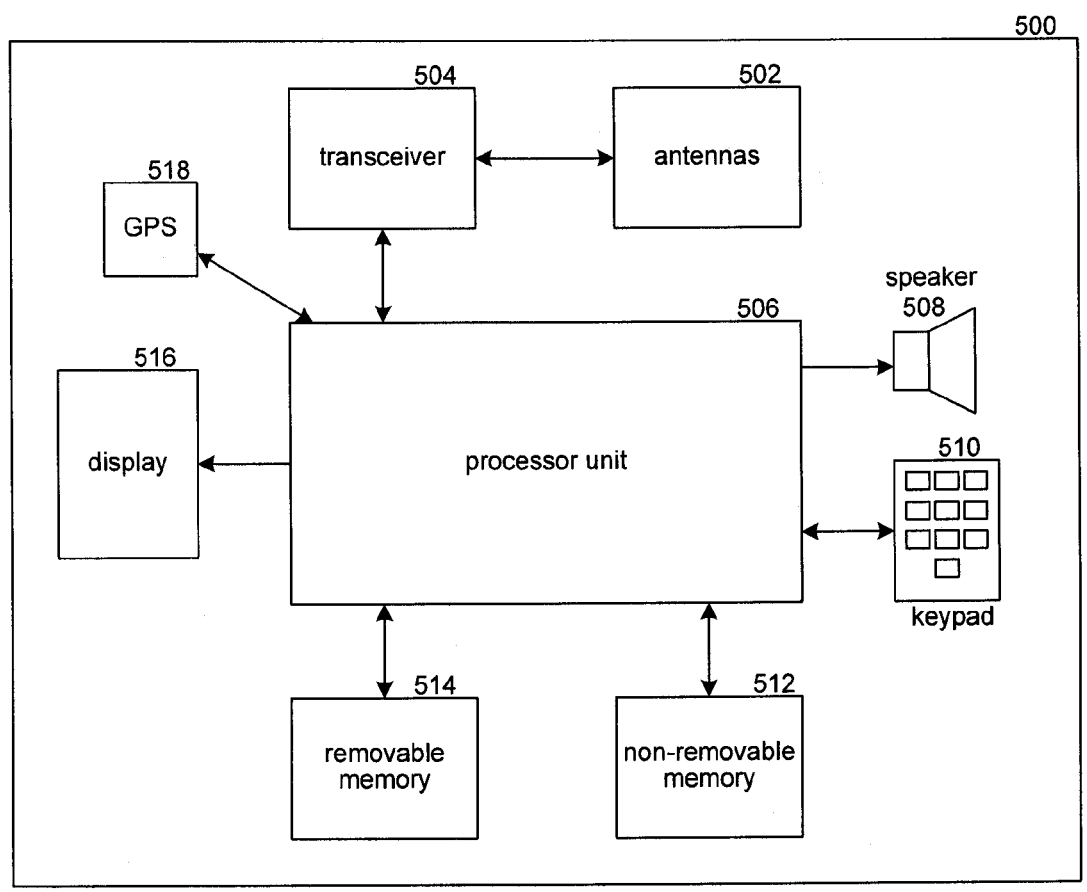
FIG. 5 is a block diagram illustrating an example of a mobile device for use under some embodiments of the technology.

FIG. 5 shows a block diagram of a typical mobile communication device 500 such as a mobile device 110. The mobile device 500 has one or more internal or external antennas 502 for receiving and transmitting electromagnetic signals such as radio frequency signals. A transceiver 504 is connected to antenna 502 and typically provides modulation and demodulation of the transmitted and received signals, respectively. A processor unit 506 connected to the transceiver 504 may comprise a signal processor, microprocessor, ASIC, or other control and processing logic circuitry. A processor unit 506 may perform signal coding, data processing, input/output processing, power control, and other functions necessary for implementing a mobile communication device. A user might provide input to the processor unit 506 via a keypad 510, speaker/microphone 508, or display/touchpad 516. In turn, the processor 506 might provide information to the user via the display/touchpad 516 or speaker/microphone 508. Additionally, the processor 506 may access information from, and store information in, a non-removable memory 512 or a removable memory 514. Non-removable memory 512 may consist of RAM, ROM, a hard disk, or other well-known memory storage technologies. Removable memory 514 may consist of Subscriber Identity Module (SIM) cards that are well known in GSM communication systems or other well-known memory storage technologies. The mobile communication device 500 may also include an optional GPS or other locational chipset or receiver 518 that provides latitude and longitude information about the mobile device's 500 current location.

Figure 6:
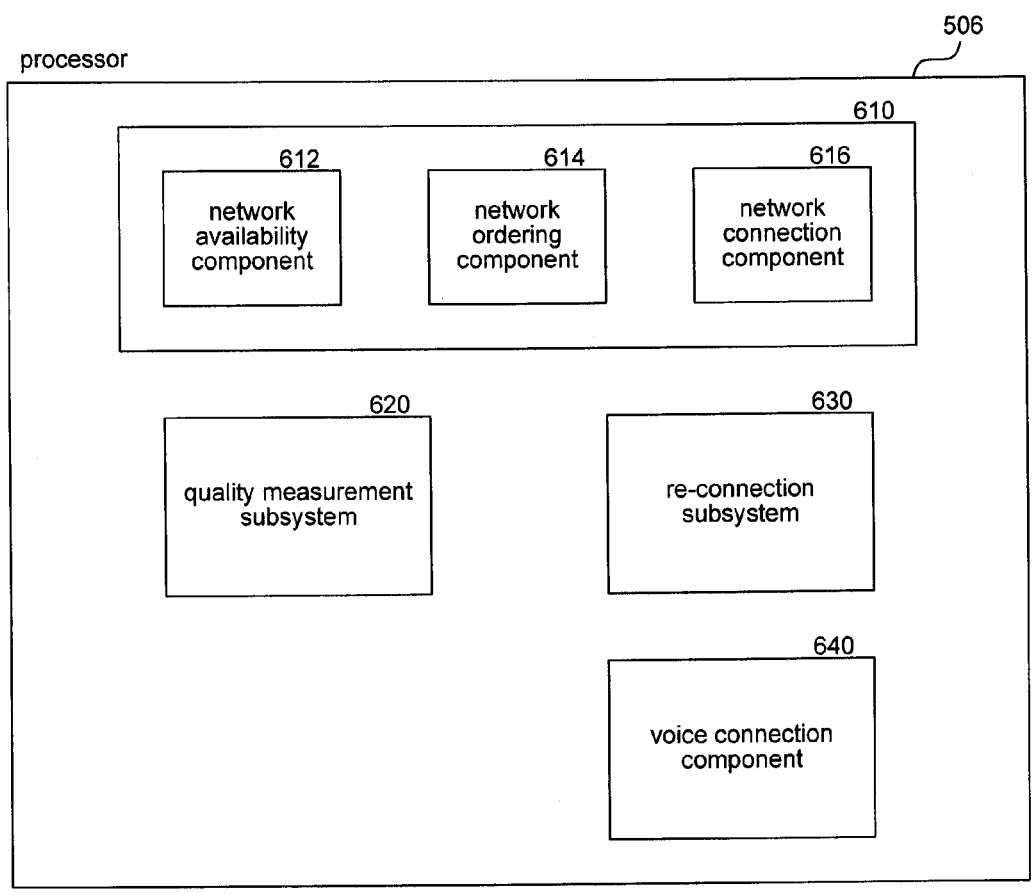
FIG. 6 is a block diagram illustrating the processor of FIG. 5 under some embodiments of the technology.

FIG. 6 shows a block diagram of components within processor 506 of mobile device 500. In some embodiments, processor 506 includes a connection subsystem 610, which may contain a network availability component 612 configured to determine alternate wireless networks available to access by mobile device 500, a network ordering component 614 configured to sort and present available alternate wireless networks to the mobile device for access, and a network connection component 616 configured to connect the mobile device 500 to an available alternate wireless network. Further, the processor 506 may contain a quality measurement subsystem 620 capable of measuring the quality of a connected network and a reconnection subsystem 630 capable of automatically initiating and connecting to previously connected networks. Also, the processor 506 may contain a voice connection component 640 that facilitates the use of voice over a connected IP-based wireless network.

The system may use various types of buttons on the mobile handset 500 for invoking connection. In some embodiments, a dedicated or special purpose connect button is provided on the mobile device to perform a specific function, namely invoking the wireless network connection process or routine 300. The button may be located on the front, top, side or other locations on the device.

Alternatively, an existing special purpose button or key on the mobile handset may have a second mode when it is pressed and held, so as to launch the connect invocation process described above. For example, by pressing and holding a power button on the mobile device, the button may perform a different function, namely causing the mobile device to invoke a connection to an available network. Alternatively, a common button (e.g., number key) that normally performs nonconnection functions may be used to perform connection functions One method for initiating this dual function would be to press and hold the common button, such as pressing and holding the "0" button. If the mobile device employs a touch sensitive screen, a software button may be provided via the screen to access or execute the routine 300.

Alternatively or additionally, the system may initiate routine 300 upon receipt of voice commands. For example, voice commands (which may be user specific) such as "wifi mode," "connect," and so on may cause routine 300 to begin connection.

Alternatively or additionally, the connect option may be within the functionality of the mobile device. For example, a user of the device may select the "menu" feature, followed by a alternate wireless network option and then a connect option that then instructs the device to invoke the connect functionality described above. A minimum number of clicks or menu choices are needed (e.g., two or less from accessing a main menu) to execute the routine 300.

Alternatively or additionally, the system may initiate routine 300 via other user or non-user based invocations. The device may contain a timer (such as a linear timer or a timer with a backoff algorithm) or may be triggered by user specified events stored in the mobile device (such as a calendar event). For example, the user may have an access point at his or her office, and set his or her mobile device to automatically connect during scheduled work/home times. Environmental factors may also initiate routine 300 of the system. Examples of these factors include the mobile device powering on, detection by the mobile device of weak or no GSM coverage, detection of no GSM coverage by the user's preferred carrier, the powering down of a GSM mode of the mobile device, and so on.

In some embodiments, the mobile device may indicate to a user the presence of an alternate wireless network access point for UMA communications. For example, the mobile device may blink its light, blink its light in a special pattern, change colors, provide an auditory indication, vibrate, display an indication on the user interface, or otherwise indicate the presence of an alternate wireless network. Likewise, the mobile phone may provide similar or other indications when the mobile device leaves the range of an alternate wireless network.

In some embodiments, the mobile device may attempt to connect with networks other than WiFi networks, such as other short range wireless networks. Other wireless networks include IP-based wireless access networks such as IEEE 802.16 (WiMAX) networks, IEEE 802.20 Mobile Broadband Wireless Access (MBWA), Ultra Wideband (UWB) networks, Bluetooth networks, and other know wireless networks.

Aspects of the technology enable a mobile device to access a UMA network via the best quality alternate wireless network available to the device. In some examples, methods and systems of the technology order available networks by signal strength and attempt to connect to the strongest network in the list. Additionally, the technology provides for re-connection to previously connected networks.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to". As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A mobile device capable of communicating with a cellular telephone network over a licensed spectrum, and capable of accessing alternate wireless access networks, the mobile device comprising:
    a connection subsystem capable of connecting the mobile device to multiple alternate wireless networks, wherein the alternate wireless networks operate on a licensed, semilicensed or unlicensed wireless spectrum,
        wherein the alternate wireless networks are wireless local area networks, and wherein the connection subsystem comprises:
        a connection invocation component configured to receive a connection request from a user and initiate a voice connection to an alternate wireless network;
        a scanning component configured to determine one or more available alternate wireless networks to be connected to the mobile device after the connection invocation component receives a connection request from a user and initiate a voice connection to an alternate wireless network; and
        a network ordering component configured to order the determined one or more alternate wireless networks based on a measure of signal strength, wherein the network ordering component also measures respective signal strengths for the determined alternate wireless networks;
        wherein the connection subsystem connects to one of the alternate wireless networks highest in the order of alternate wireless networks; and
    a quality measurement subsystem, wherein the quality measurement subsystem is configured to initially check a voice connection to a determined alternate wireless network to determine if a quality of the voice connection is above a pre-determined threshold value, and is configured to periodically check the connected network to determine if the quality of the connected network remains above the pre-determined threshold value;
        wherein the mobile device operates in an alternate wireless network mode when the quality of the voice connection is above the pre-determined threshold value, and wherein the mobile device, in the alternate wireless network mode, communicates with a core network through the one alternate wireless network for the voice connection.

2. The mobile device of claim 1 wherein the connection subsystem connects to an alternate wireless network below the alternate wireless network highest in the order of alternate wireless networks when the quality measurement subsystem determines the quality of the alternate wireless network highest in the order of alternate wireless networks to be below the pre-determined threshold value.

3. The mobile device of claim 1, wherein the connection subsystem further comprises:
    a reconnection component configured to automatically attempt to reconnect to the connected one alternate wireless network when the mobile device leaves the range of the connected one alternate wireless network;
    wherein the reconnection component automatically attempts to reconnect to the connected one alternate wireless network only within a pre-determined time period.

4. The mobile device of claim 1 wherein the alternative wireless networks include only General Access Network (GAN) or Unlicensed Mobile Access (UMA)-compatible wireless networks.

5. The mobile device of claim 1 wherein the mobile device, after having accessed the same alternative wireless network two or more times, prompts the user whether to add the same alternative wireless network to a stored list of networks.

6. The mobile device of claim 1 wherein the mobile device provides an indication to the user after successfully connecting to an alternative wireless network, wherein the indication includes a signal strength, a name of the connected alternative wireless network, or an SSID for the connected alternative wireless network.

7. The mobile device of claim 1 wherein the mobile device is further configured to provide an indication to the user of an available alternative wireless network, wherein the indication is a vibration, a display indication, or an auditory indication.

8. The mobile device of claim 1, wherein the connection subsystem further comprises:
    a reconnection component configured to automatically attempt to reconnect to the connected one alternate wireless network as long as the device remains within a predetermined geographic radius, or
        within communications of a same cell tower of the cellular telephone network that the device was in communication with before the device connected to one of the alternate wireless networks.

9. The mobile device of claim 1 wherein the connection invocation component is further configured to receive a voice command from a user before initiating the voice connection to the alternative wireless network.

10. The mobile device of claim 1 wherein the connection invocation component is further configured to initiate the voice connection to the alternative wireless network based on user-specified calendar events, or based on user-specified events stored in the device.

11. The mobile device of claim 1 wherein the connection invocation component is further configured to initiate the voice connection to the alternative wireless network based on environmental factors, wherein the environmental factors include
    the mobile device powering on,
    detection by the mobile device of weak coverage from the cellular telephone network,
    detection by the mobile device of no coverage from the cellular telephone network,
    detection by the mobile device of no coverage by a user's preferred cellular telephone network, or
    powering down of a cellular telephone network mode of the mobile device.

12. A method of connecting a mobile device to a core network via an alternate wireless network, wherein the mobile device is also capable of connecting wirelessly with a cellular telephone network, the method comprising:

determining alternate wireless networks available to access by the mobile device,
  wherein the alternate wireless networks are wireless local area networks, and
ordering the available alternate wireless networks by signal strength;
connecting the mobile device to the available alternate wireless network with a highest signal strength;
measuring a quality of the connected alternate wireless network,
  wherein the measured quality is associated with a quality of communications provided by the connected alternate wireless network; and
when the quality of the connected alternate wireless network is above a pre-determined threshold, operating the mobile device on the core network via the connected alternate wireless network.

13. The method of claim 12, wherein the mobile device is one of a mobile handset, personal digital assistant, or laptop computer.

14. The method of claim 4, wherein the connected alternate wireless network is an IEEE 802.11a, IEEE 802.11b, IEEE 802.11g or IEEE 802.11n network.

15. The method of claim 12, wherein the connected alternate wireless network is one of an IEEE 802.16 network, an IEEE 802.20 Mobile Broadband Wireless Access network, an Ultra Wideband network, or a Bluetooth network.

16. The method of claim 12, wherein the signal strengths of determined available alternate wireless networks are measured by the mobile device.

17. The method of claim 12, wherein at least one of the determined alternate wireless networks available to access by the mobile device is stored in a database within the mobile device.

18. The method of claim 12, further comprising:
connecting the mobile device to an alternate wireless network with the next highest signal strength when the quality of the alternate wireless network with the highest signal strength is below the pre-determined threshold.

19. The method of claim 12, further comprising:
automatically attempting to reconnect to the connected alternate wireless network for a predetermined time period when the mobile device moves out of a range of the connected alternate wireless network.

20. A portable apparatus for establishing communications with at least one cellular telephone system and with an access point of at least one of multiple alternative wireless networks, the apparatus comprising:

an antenna;
at least one wireless transceiver, coupled to the antenna, for wirelessly exchanging signals between the apparatus and at least one access point of one or more alternative wireless networks, and between the apparatus and the cellular telephone system;
at least one memory for storing data;
at least one portable power generation subsystem;
at least one audio portion for processing voice signals;
processor means, coupled among the transceiver, the audio portion, the portable power generation subsystem and the memory, for permitting wireless communication with the alternate wireless network;
a housing configured to carry the antenna, transceiver, portable power generation subsystem, memory, audio portion and processor means; and
a user interlace means, carried by the housing and coupled to the processor means, for providing a user interlace to permit user activation of an alternate wireless connection process, and
wherein the processor means includes:
  means for automatically identifying any available alternate wireless network in response to manual activation of the alternate wireless connection process,
    wherein the alternate wireless networks are wireless local area networks (WLANs), and
    wherein at least some of the WLANs are not operated by an operator of the cellular telephone network;
  means for automatically establishing a predetermined connection with an access point of an identified available alternate wireless network;
  means for automatically determining if the identified available alternate wireless network provides a connection of acceptable quality for voice communications over the identified network; and
  means for automatically establishing voice communications over the identified available alternate wireless network.

21. The apparatus of claim 20 wherein the user interlace means is either a physical button carried by and at least partially accessible at a portion of the housing, or is a touch-sensitive screen associated with a default software switch controlled by the processor means.

22. The apparatus of claim 20, wherein the processor means further comprises:
means for automatically establishing a direct connection to the cellular telephone system when the connection to the identified available alternate wireless network is of unacceptable quality for voice communications over the identified network;
means for automatically determining if the identified available alternate wireless network again provides a connection of acceptable quality for voice communications over the identified network; and
means for automatically reestablishing the predetermined connection with the identified available alternate wireless network, or maintaining the direct connection with the cellular telephone system.

23. The apparatus of claim 20 wherein the identified available alternate wireless network is an IEEE 802 version WLAN, wherein the predetermined connection is an Unlicensed Mobile Access (UMA) connection, and wherein the means for automatically identifying any available WLAN provides a list of available list of unsecured WLANs ordered from strongest to weakest signal strength.

24. The apparatus of claim 20, further comprising output means for providing a user-perceptible indication that an access point of an available alternate wireless networks is within wireless range.

25. A tangible computer-readable medium whose contents cause at least one mobile device to perform a method to automatically establish communications with at least one cellular telephone system through at least one of multiple alternate wireless networks, the method comprising:
at the mobile device, automatically identifying any available alternate wireless network while the mobile device has a connection with the cellular telephone system,
  wherein the alternate wireless networks are wireless local area networks, and
at the mobile device, automatically establishing a predetermined connection with an access point of an identified available alternate wireless network;

at the mobile device, automatically determining if the identified available alternate wireless network provides a connection of acceptable quality; and at the mobile device, automatically establishing voice communications through the identified available alternate wireless network as opposed to directly over the cellular telephone system.

26. The computer-readable medium of claim 25 wherein the method further comprises:

at the mobile device, automatically establishing a direct connection to the cellular telephone system when the established connection is of unacceptable quality for voice traffic;

at the mobile device, periodically determining if the identified available alternate wireless network again provides a connection of acceptable quality for voice traffic; and at the mobile device, automatically reestablishing the predetermined connection with the identified available alternate wireless network, or maintaining the connection with the cellular telephone system, after a predetermined time.

27. The computer-readable medium of claim 25 wherein the method further comprises:

at the mobile device, automatically establishing a direct connection to the cellular telephone system when the established connection is of unacceptable quality for voice traffic; and at the mobile device, automatically determining if the identified available alternate wireless network again provides a connection of acceptable quality for voice traffic while the mobile device is
(1) within a predetermined distance from a location when the predetermined connection was established, or
(2) is in communications range of a cell site while the mobile device has the wireless connection with the cellular telephone system.

28. The computer-readable medium of claim 25 wherein the method further comprises, at the mobile device, automatically applying business rules to manage the established voice connection if the quality of the connection changes.

29. The computer-readable medium of claim 25 wherein the automatically identifying is in response to manual user input.

30. The computer-readable medium of claim 25 wherein the automatically identifying is in response to a voice prompt received from a user.

31. The computer-readable medium of claim 25 wherein the automatically identifying is in response to the mobile device losing the connection with the cellular telephone system.

32. The computer-readable medium of claim 25 wherein the automatically identifying is in response to a timer within the mobile device.

* * * * *

UNITED STATES PATENT AND TRADEMARK OFFICE
CERTIFICATE OF CORRECTION

PATENT NO. : 7,623,486 B2
APPLICATION NO. : 11/480775
DATED : November 24, 2009
INVENTOR(S) : Christopher Caldwell et al.

It is certified that error appears in the above-identified patent and that said Letters Patent is hereby corrected as shown below:

In column 13, line 23, in Claim 14, delete "4," and insert -- 12, --, therefor.

In column 14, line 1, in Claim 20, delete "interlace" and insert -- interface --, therefor.

In column 14, line 2, in Claim 20, delete "interlace" and insert -- interface --, therefor.

In column 14, line 23, in Claim 21, delete "interlace" and insert -- interface --, therefor.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,623,486 B2 |
| APPLICATION NO. | : 11/480775 |
| DATED | : November 24, 2009 |
| INVENTOR(S) | : Caldwell et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Twenty-sixth Day of October, 2010

David J. Kappos
*Director of the United States Patent and Trademark Office*